United States Patent
Yu et al.

(10) Patent No.: US 11,046,570 B2
(45) Date of Patent: Jun. 29, 2021

(54) DRINKING LIQUID SUPPLY DEVICE AND METHOD FOR CONTROLLING SAME

(71) Applicant: LG ELECTRONICS INC., Seoul (KR)

(72) Inventors: Kiwon Yu, Seoul (KR); Youngjin Kim, Seoul (KR); Kowoon Baek, Seoul (KR); Kyungsoo Oh, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/461,210

(22) PCT Filed: Dec. 11, 2017

(86) PCT No.: PCT/KR2017/014452
§ 371 (c)(1),
(2) Date: May 15, 2019

(87) PCT Pub. No.: WO2018/106083
PCT Pub. Date: Jun. 14, 2018

(65) Prior Publication Data
US 2019/0308865 A1 Oct. 10, 2019

(30) Foreign Application Priority Data
Dec. 9, 2016 (KR) .................. 10-2016-0167575

(51) Int. Cl.
B67D 1/07 (2006.01)
B01D 35/30 (2006.01)
(Continued)

(52) U.S. Cl.
CPC .............. B67D 1/07 (2013.01); B01D 35/30 (2013.01); B67D 1/08 (2013.01); B67D 1/0857 (2013.01);
(Continued)

(58) Field of Classification Search
CPC .................. C02F 1/4618; C02F 1/003; C02F 2001/46185; C02F 2303/04;
(Continued)

(56) References Cited

U.S. PATENT DOCUMENTS 2,882,210 A * 4/1959 Jenks .................... C02F 1/4674
205/747
3,785,492 A * 1/1974 Mazza ................. B67D 1/0406
210/149
(Continued)

FOREIGN PATENT DOCUMENTS

JP 2015-147593 8/2015
KR 10-2004-0028270 4/2004
(Continued)

OTHER PUBLICATIONS

International Search Report (English Translation) dated Mar. 6, 2018 issued in Application No. PCT/KR2017/014452.
(Continued)

*Primary Examiner* — Michael J. Melaragno
(74) *Attorney, Agent, or Firm* — Ked & Associates, LLP (57) ABSTRACT

The present invention provides a method for controlling a drinking-water supply device, the method comprising: a first step of connecting a guide pipe of a case separated from a cabinet to form a channel through which water moves from the case to the cabinet; a second step of supplying the cabinet with hot water heated by a second hot water module included in the case; and a third step of supplying the cabinet with water which has not passed through the second hot water module included in the case, wherein a first hot water module, included in the cabinet, for heating water is not driven in the second step and the third step.

12 Claims, 9 Drawing Sheets

(51) Int. Cl.
*B67D 1/08* (2006.01)
*B67D 1/12* (2006.01)
*C02F 1/00* (2006.01)

(52) U.S. Cl.
CPC .............. *B67D 1/0895* (2013.01); *B67D 1/12* (2013.01); *B67D 1/1277* (2013.01); *C02F 1/003* (2013.01); *B67D 2001/075* (2013.01)

(58) Field of Classification Search
CPC ......... C02F 2307/10; B67D 1/07; B67D 1/08; B67D 1/0857; B67D 1/0895; B67D 1/12; B67D 1/1202; B67D 2001/075; C25B 1/04; Y02E 60/366
USPC ...................................................... 222/146.1
See application file for complete search history.

(56) References Cited

U.S. PATENT DOCUMENTS

| | | | | |
|---|---|---|---|---|
| 4,007,856 A * | 2/1977 | Murphy | ............... | B67D 1/0857 222/67 |
| 4,048,044 A * | 9/1977 | Eibl | ............... | A61L 2/035 204/257 |
| 4,152,238 A * | 5/1979 | Okazaki | ............... | C02F 1/46104 204/228.1 |
| 4,420,811 A * | 12/1983 | Tarnay | ............... | G05D 23/1393 137/561 R |
| 4,623,467 A * | 11/1986 | Hamlin | ............... | B01D 61/08 210/257.2 |
| 4,624,395 A * | 11/1986 | Baron | ............... | A47J 31/401 222/129.1 |
| 4,969,991 A * | 11/1990 | Valadez | ............... | B01D 61/08 210/104 |
| 5,443,739 A * | 8/1995 | Vogel | ............... | B01D 61/08 210/652 |
| 5,667,103 A * | 9/1997 | Donselman | ............... | B67D 3/00 222/129 |
| 5,669,221 A * | 9/1997 | LeBleu | ............... | B01D 5/0072 62/92 |
| 5,833,096 A * | 11/1998 | Ohu | ............... | B67D 3/0009 222/146.1 |
| 5,889,684 A * | 3/1999 | Ben-David | ............... | A47J 31/525 700/282 |
| 6,113,853 A * | 9/2000 | Nakamura | ............... | A61L 2/18 210/748.2 |
| 6,270,650 B1 * | 8/2001 | Kazi | ............... | C02F 1/46104 204/242 |
| 6,312,608 B1 * | 11/2001 | Buckner | ............... | A23L 2/50 210/748.03 |
| 6,636,151 B2 * | 10/2003 | Busick | ............... | B67D 3/0032 340/521 |
| 7,008,529 B2 * | 3/2006 | Nakanishi | ............... | C02F 1/4674 210/98 |
| 7,325,485 B2 * | 2/2008 | Carhuff | ............... | A47J 31/46 99/452 |
| 7,347,345 B2 * | 3/2008 | Guerrero | ............... | A61L 2/18 134/168 C |
| 7,401,613 B2 * | 7/2008 | Carhuff | ............... | A61L 2/08 134/22.18 |
| 7,694,850 B2 * | 4/2010 | Guerrero | ............... | A61L 2/18 134/168 C |
| 7,857,910 B2 * | 12/2010 | Carhuff | ............... | A47J 31/41 134/22.18 |
| 8,007,666 B1 * | 8/2011 | Davis | ............... | C02F 1/78 210/192 |
| 8,431,008 B2 * | 4/2013 | Kim | ............... | C02F 1/4674 204/262 |
| 8,499,978 B2 * | 8/2013 | Dalchau | ............... | B67D 1/0014 222/146.1 |
| 8,603,392 B2 * | 12/2013 | Johnson | ............... | C01B 11/06 205/265 |
| 8,808,537 B1 * | 8/2014 | Livingston | ............... | C02F 9/005 210/196 |
| 8,850,841 B2 * | 10/2014 | Kim | ............... | F25D 11/022 62/344 |
| 9,512,018 B1 * | 12/2016 | Kolls | ............... | C02F 1/467 |
| 9,656,896 B2 * | 5/2017 | Kim | ............... | C02F 9/005 |
| 10,031,533 B2 * | 7/2018 | Jeong | ............... | G05D 16/2066 |
| 10,053,349 B2 * | 8/2018 | Yoon | ............... | B67D 1/0864 |
| 10,167,208 B2 * | 1/2019 | Lee | ............... | C02F 1/4672 |
| 10,399,874 B2 * | 9/2019 | Lee | ............... | C02F 1/008 |
| 10,501,303 B2 * | 12/2019 | Lee | ............... | B67D 1/0043 |
| 10,549,977 B2 * | 2/2020 | Kim | ............... | B67D 1/1279 |
| 2003/0230597 A1 * | 12/2003 | Naik | ............... | G07F 15/04 222/129.1 |
| 2003/0234212 A1 * | 12/2003 | Ito | ............... | C02F 1/4618 210/85 |
| 2004/0129723 A1 * | 7/2004 | Meder | ............... | B01D 3/02 222/113 |
| 2005/0098575 A1 * | 5/2005 | Carhuff | ............... | A47J 31/4485 221/150 R |
| 2005/0115597 A1 * | 6/2005 | Carhuff | ............... | G07F 13/06 134/134 |
| 2006/0191785 A1 * | 8/2006 | Ito | ............... | C02F 1/4618 204/228.6 |
| 2007/0267441 A1 * | 11/2007 | van Opstal | ............... | B67D 1/0857 222/129.4 |
| 2009/0014464 A1 * | 1/2009 | Adbelmoteleb | ............... | B67D 1/07 222/1 |
| 2010/0187128 A1 * | 7/2010 | Neubert | ............... | B01D 5/0057 205/743 |
| 2010/0212333 A1 * | 8/2010 | Moon | ............... | B67D 1/0857 62/85 |
| 2011/0100838 A1 * | 5/2011 | Kim | ............... | C02F 1/4674 205/742 |
| 2012/0104031 A1 * | 5/2012 | McDonald | ............... | B67D 1/0014 222/1 |
| 2012/0125845 A1 * | 5/2012 | McDonald | ............... | B01D 61/12 210/636 |
| 2012/0291800 A1 * | 11/2012 | Johnson | ............... | C23F 11/173 134/3 |
| 2012/0318823 A1 * | 12/2012 | Yoon | ............... | B67D 1/0857 222/146.1 |
| 2013/0062219 A1 * | 3/2013 | Lee | ............... | B01D 61/025 205/742 |
| 2013/0105513 A1 * | 5/2013 | Krause | ............... | B67D 1/0858 222/69 |
| 2013/0108249 A1 * | 5/2013 | Krause | ............... | B67D 3/0022 392/465 |
| 2013/0140328 A1 * | 6/2013 | Gates | ............... | B08B 9/02 222/148 |
| 2013/0220903 A1 * | 8/2013 | Tsai | ............... | C02F 1/441 210/104 |
| 2014/0083846 A1 * | 3/2014 | Moon | ............... | B01D 61/12 204/274 |
| 2014/0096799 A1 * | 4/2014 | Joung | ............... | C02F 1/467 134/22.1 |
| 2014/0130891 A1 * | 5/2014 | Abdelmoteleb | ............... | B67D 1/0036 137/15.05 |
| 2015/0298958 A1 * | 10/2015 | Orita | ............... | B67D 3/0009 222/146.5 |
| 2016/0002020 A1 * | 1/2016 | Orita | ............... | B67D 3/0058 222/146.6 |
| 2016/0009537 A1 * | 1/2016 | Orita | ............... | B67D 1/0009 222/144.5 |
| 2016/0016776 A1 * | 1/2016 | Orita | ............... | B67D 1/0895 222/146.1 |
| 2016/0016777 A1 * | 1/2016 | Orita | ............... | B67D 1/001 222/54 |
| 2016/0023880 A1 * | 1/2016 | Forte | ............... | B67D 1/0895 134/18 |
| 2016/0031694 A1 * | 2/2016 | Orita | ............... | B67D 1/07 222/638 |
| 2016/0046508 A1 * | 2/2016 | Orita | ............... | B67D 1/07 222/146.1 |
| 2016/0052769 A1 * | 2/2016 | Orita | ............... | B67D 1/0009 222/108 |
| 2016/0167990 A1 * | 6/2016 | Lee | ............... | C02F 1/686 137/268 |

(56) References Cited

U.S. PATENT DOCUMENTS

| | | | |
|---|---|---|---|
| 2016/0168828 A1* | 6/2016 | Jeong | B67D 1/0014 137/10 |
| 2016/0229715 A1* | 8/2016 | Kim | C02F 9/005 |
| 2016/0229716 A1* | 8/2016 | Lee | C02F 1/4672 |
| 2017/0050835 A1* | 2/2017 | Moon | B67D 1/0895 |
| 2017/0050836 A1* | 2/2017 | Yoon | B67D 1/0081 |
| 2017/0050837 A1* | 2/2017 | Kim | B67D 1/0895 |
| 2018/0118592 A1* | 5/2018 | Rosko | E03C 1/055 |
| 2018/0229991 A1* | 8/2018 | Yu | C02F 1/687 |
| 2018/0370831 A1* | 12/2018 | Moon | B01D 37/04 |
| 2019/0070643 A1* | 3/2019 | Wong | B08B 3/102 |
| 2019/0153367 A1* | 5/2019 | Min | C12C 11/00 |
| 2019/0169540 A1* | 6/2019 | Solomon | B08B 3/08 |
| 2019/0284065 A1* | 9/2019 | Karren | B08B 3/10 |
| 2019/0308865 A1* | 10/2019 | Yu | B01D 35/30 |
| 2019/0308892 A1* | 10/2019 | Yu | C02F 1/003 |
| 2020/0031654 A1* | 1/2020 | Wing | F25D 17/00 |

FOREIGN PATENT DOCUMENTS

| | | | |
|---|---|---|---|
| KR | 10-0496675 | 6/2005 | |
| KR | 10-2006-0030614 | 4/2006 | |
| KR | 10-2014-0078248 | 6/2014 | |
| KR | 10-2014-0131614 | 11/2014 | |
| KR | 10-1507860 | 4/2015 | |
| WO | WO-2018106083 A1 * | 6/2018 | ........... B67D 1/0857 |
| WO | WO-2018106084 A1 * | 6/2018 | ............... B67D 1/07 |

OTHER PUBLICATIONS

Written Opinion (English Translation) dated Mar. 6, 2018 issued in Application No. PCT/KR2017/014452.
Indian Office Action dated Aug. 17, 2020 issued in IN Application No. 201917018810.
Australian Notice of Allowance dated Sep. 8, 2020 issued in AU Application No. 2017371316.

* cited by examiner

DRINKING LIQUID SUPPLY DEVICE AND METHOD FOR CONTROLLING SAME

CROSS-REFERENCE TO RELATED PATENT APPLICATIONS

This application is a U.S. National Stage Application under 35 U.S.C. § 371 of PCT Application No. PCT/KR2017/014452, filed Dec. 11, 2017, which claims priority to Korean Patent Application No. 10-2016-0167575, filed Dec. 9, 2016, whose entire disclosures are hereby incorporated by reference.

TECHNICAL FIELD

The present invention relates to a drinking water supply device and a method for controlling the same, and more particularly, to a drinking water supply device and a method for controlling the same, which is capable of washing a path through which water passes in the drinking water supply device.

BACKGROUND ART

A drinking water supply device is a device that supplies drinking water to a user. The drinking water supply device may be a stand-alone device, or may constitute a part of other device.

For example, a water purifier is a device that allows original water supplied from a hydrant to pass through a separate filtering means and filters the original water in the filtering means to supply the filtered water to a user. Further, a device that supplies the filtered water as cold water or hot water to the user as needed may be regarded as the water purifier. The water purifier may be a stand-alone device from other electric home appliance.

Meanwhile, the drinking water supply device may constitute a part of an electric home appliance, such as a refrigerator. That is, water purified through the water purifier in the refrigerator may be supplied to the outside through the drinking water supply device. Water purified in the refrigerator may be cooled or frozen to allow cold water or ice to be supplied to the outside through the drinking water supply device.

The drinking water supply device is provided to supply drinking water to a user regardless of stand-alone from the other device. In other words, the drinking water supply device may be a device having a dispenser which is a space to which drinking water is supplied.

A variety of debris may be stuck to the path through which water passes in the drinking water supply device, whereby bacteria may breed. In this respect, it is required to clean the path.

DISCLOSURE

Technical Problem

An object of the present invention devised to solve one or more problems due to limitations and disadvantages of the related art is to provide a drinking water supply device capable of cleaning a path through which water passes.

Technical Solution

To achieve these objects and other advantages and in accordance with the purpose of the invention, a drinking water supply device comprises a cabinet; a purified water extraction valve provided in the cabinet, switching a path provided outside the cabinet to discharge purified water to a user; a cold water module provided in the cabinet, cooling externally supplied water; a cold water extraction valve switching a path for discharging water cooled by the cold water module to the user; a first hot water module provided in the cabinet, heating externally supplied water; a hot water extraction valve switching a path for discharging hot water heated by the first hot water module to the user; a case provided to be detached from the cabinet; a second hot water module provided in the case, heating externally supplied water; and a guide pipe coupled to the case and detachably provided in the cabinet, moving water which has passed through the case to the cabinet, wherein water which has not passed through the case is supplied to the cabinet when any one of purified water, hot water and cold water is supplied to the user.

The guide pipe may be coupled to the cabinet, and water which has passed through the case may be supplied to the cabinet when a path through which water inside the cabinet moves is cleaned. The cabinet may be provided with a first controller for controlling the purified water extraction valve, the hot water extraction valve, and the cold water extraction valve.

The first controller may open the purified water extraction valve, the hot water extraction valve and the cold water extraction valve if the water which has passed through the case is supplied to the cabinet. The cabinet may be provided with a water extraction vale switching a path where water is supplied to the user through the purified water extraction valve, the hot water extraction valve and the cold water extraction valve.

The water extraction valve may also be opened if the first controller opens the purified water extraction valve, the hot water extraction valve and the cold water extraction valve. The case may include a first valve switching a path where water is supplied to the second hot water module, and a second valve switching a bypass path so as not to supply water to the second hot water module.

The case may be provided with a second controller for controlling the first valve and the second valve. The second controller may open the first valve and close the second valve if the second hot water module is driven. The second controller may close the first valve and open the second valve if the second hot water module is driven.

The second controller may repeatedly open and close the second valve in a state that the first valve is closed. The drinking water supply device may further comprise a divergence pipe for diverging externally supplied water into the purified water extraction valve, the cold water module and the first hot water module. The drinking water supply device may further comprise a first filter and a second filter detachably provided in the cabinet, wherein water which has passed through the first filter and the second filter may be guided to the divergence pipe.

Also, a method for controlling a drinking water supply device comprises a first step of connecting a guide pipe of a case detached from a cabinet to the cabinet to form a path through which water moves from the case to the cabinet; a second step of supplying hot water heated by a second hot water module included in the case to the cabinet; and a third step of supplying water which has not passed through the second hot water module included in the case to the cabinet, wherein a first hot water module provided in the cabinet to heat water is not driven in the second step and the third step. The hot water supplied to the cabinet in the second step may be discharged to the outside of the cabinet, and the water supplied to the cabinet in the third step may be discharged to the outside of the cabinet.

In the second step and the third step, a purified water extraction valve provided in the cabinet, switching a path provided outside the cabinet to discharge purified water to a user, a cold water extraction valve provided in the cabinet, switching a path for discharging cold water to the user, a hot water extraction valve provided in the cabinet, switching a path for discharging hot water to the user, and a water extraction valve provided in the cabinet, switching a path for supplying water to the user through the purified water extraction valve, the hot water extraction valve, and the cold water extraction valve may all be opened.

In the second step, a first valve provided in the case, switching a path where water is supplied to the second hot water module may be opened and a second valve provided in the case, switching a bypass path so as not to supply water to the second hot water module may be closed.

In the third step, a first valve provided in the case, switching a path where water is supplied to the second hot water module may be closed and a second valve provided in the case, switching a bypass path so as not to supply water to the second hot water module may be opened.

In the third step, opening and closing of the second valve may repeatedly be performed in a state that the first valve is closed. In the second step and the third step, water which has passed through a filter may be supplied to the case.

According to the present invention, since a path through which water moves in a drinking water supply device is able to be cleaned, a sanitary condition may be improved. Also, according to the present invention, since the path may be cleaned through two steps, a cleaning power may be improved. Since types of water supplied from the two steps are different from each other and pressures for supplying water are different from each other, the path through which the water passes may be washed more clearly.

Also, according to the present invention, since a water pressure supplied to the drinking water supply device may be increased during cleaning performed in the second step, a cleaning power may be improved due to a big pressure of the supplied water.

Also, according to the present invention, as the path through which water moves is simplified, cleaning may be performed under a simple control for opening a valve while washing water is passing through all paths through which water moves. Owing to the simplified path, a pressure is less reduced when water moves, whereby a cleaning power may be improved even in the case that a water supply system is only used. Also, according to the present invention, since room temperature water is used during the second cleaning, hot water may be prevented from being extracted when a user extracts purified water or cold water after cleaning the path.

MODE FOR CARRYING OUT THE INVENTION

Hereinafter, a preferred embodiment of the present invention through which the above objects can be implemented specifically will be described with reference to the accompanying drawings. For clarification and convenience of description, size and shape of each element shown in the drawings may be exaggerated. Also, terms particularly defined considering configuration and functions of the present invention may be modified depending on a user, intention of an operator or practices. The terms used herein should be defined not simply by the actual terms used but by the meaning lying within and the description disclosed herein.

Figure 1:
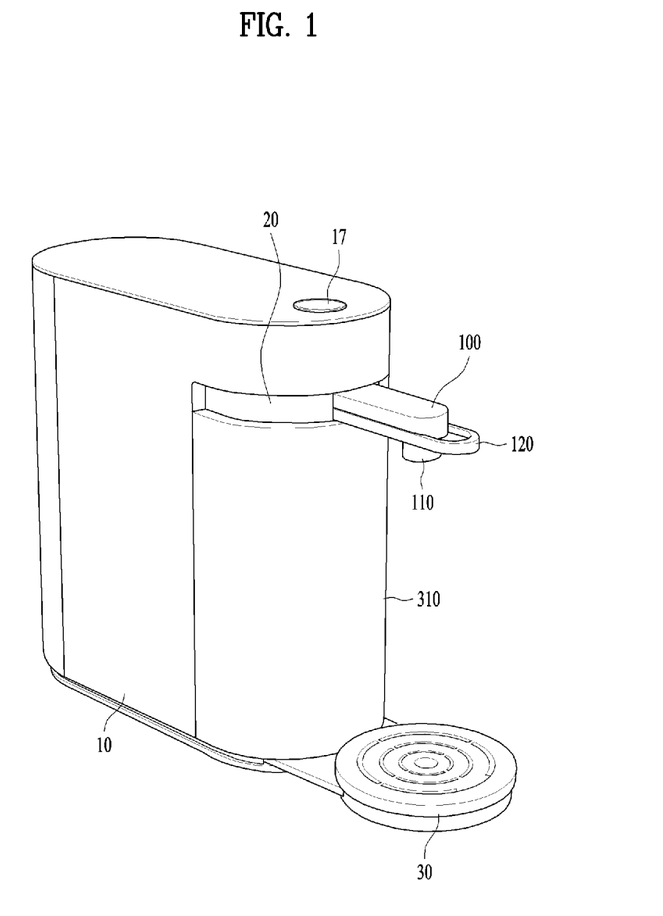
FIG. 1 is a view illustrating a drinking water supply device according to one embodiment of the present invention.

FIG. 1 is a view illustrating a drinking water supply device or liquid dispenser according to one embodiment of the present invention. Hereinafter, a description will be given with reference to FIG. 1.

In one embodiment of the present invention, a drinking water supply device for selectively supplying purified water, cooled cold water, and heated hot water to a user is provided. In one embodiment, the drinking water supply device may include a cabinet 10 forming external appearance, and a button 17 on the cabinet 10. The user may discharge water from the drinking water supply device by manipulating the button 17. The button 17 may be switched to various modes in such a way of varying a pushing time, varying pushing times, or the like. A plurality of buttons 17 may be provided such that each button may be switched to another mode when each button is pushed.

A water extraction unit or arm 100 provided to be protruded from the cabinet 10, having a water extraction pipe for allowing water to move from the cabinet 10, a water extraction nozzle 110 formed to be downwardly protruded in the water extraction unit 100 and communicated with the water extraction pipe, and a handle 120 surrounding the outer circumference of the water extraction unit 100 are provided at the front of the cabinet 10.

The water extraction unit 100 may be disposed to enable rotation with respect to the cabinet 10, whereby the user may rotate the water extraction unit 100 clockwise or counter-clockwise to a desired position. The water extraction unit 100 may be coupled to the cabinet 10 through a rotary unit 20. At this time, the rotary unit 20 may provide a structure in which the water extraction unit 100 can be rotated.

The water extraction unit 100 may be disposed to be protruded toward the front of the cabinet 10, whereby a container such as cup may easily be arranged without any restriction of the cabinet 10 when the user is supplied with water from the water extraction unit 100.

The water extraction nozzle 110 may be disposed to be downwardly exposed from the water extraction unit 100, whereby the user may easily recognize a portion where water is discharged out. Therefore, a container for receiving water may be arranged below the water extraction nozzle 110 to allow the user to be supplied with water.

Since the handle 120 may be disposed to surround the outer circumference of the water extraction unit 100, the user may rotate the water extraction unit 100 in a state that the user's hand is in contact with the handle 120. Meanwhile, the handle 120 may be disposed to surround a lower portion of the water extraction unit 100, whereby an upper portion of the water extraction unit 100 may be exposed to the outside without being surrounded by the handle 120.

A lower end of the water extraction nozzle 110 is protruded to be lower than a lower portion of the handle 120, whereby the water extraction nozzle 110 may downwardly be exposed from the lower end of the water extraction unit 100 and the handle 120. A tray 30 which can receive water dropped is provided at the lower portion of the water extraction unit 100. The tray 30 is provided with a space therein, and has a plurality of slits formed at an upper side thereof, whereby water may move into the tray 30 through the slits.

Figure 2:
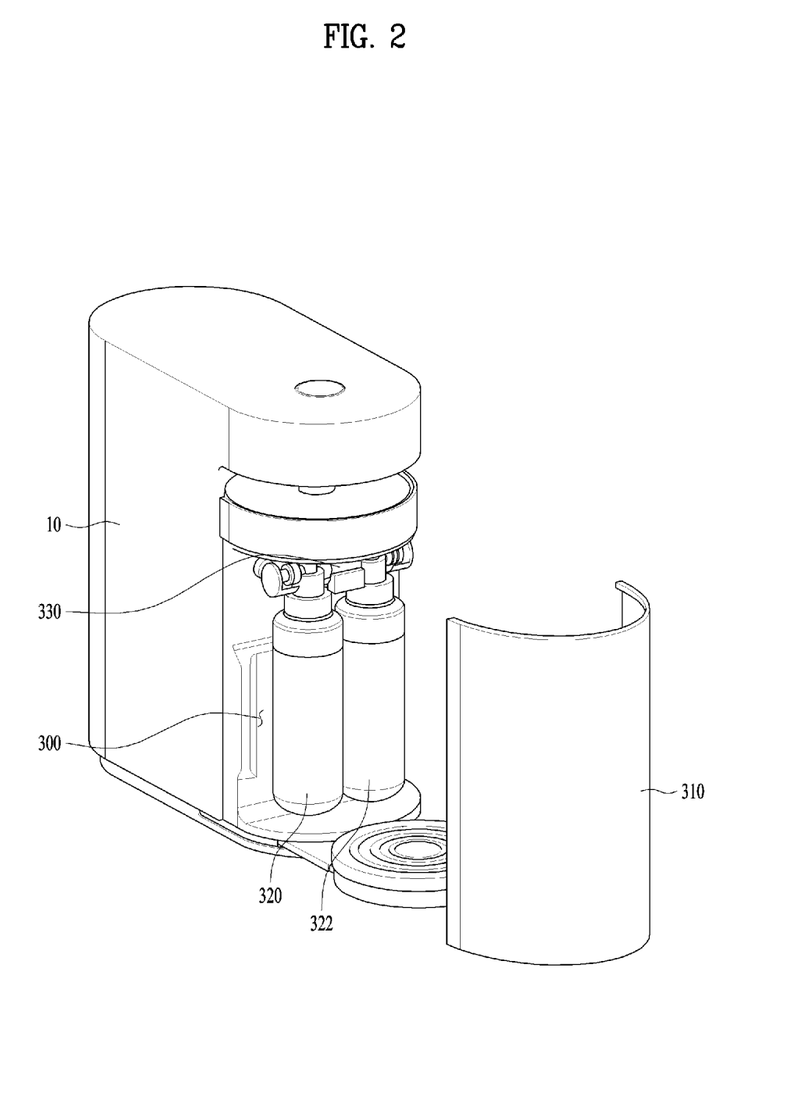
FIG. 2 is a view illustrating that a filter holder cover is detached.

Referring to FIG. 2, a filter holder 300 in which filters 320 and 322 for purifying water discharged through the water extraction nozzle 110 are provided and a filter holder cover 310 for sealing the filter holder 300 from the outside are provided at the front of the cabinet 10. The filter holder cover 310 is disposed on a front surface of the cabinet 10, whereby the user may easily approach the filter holder cover 310 as well as the water extraction unit 100.

The two filters 320 and 322 are provided in the filter holder 300, and are connected to each other by a connection pipe 330, whereby water may pass through the two filters 320 and 322 in due order. The two filters are categorized into the first filter 320 and the second filter 322. Externally supplied water is filtered through the second filter 322 after passing through the first filter 320.

The first filter 320 may be a filter that includes a sediment filter and a free-carbon filter. First of all, debris having big particles, such as sand, soil and rust of a pipe, contained in service water is first removed from water supplied from a water supply system by the sediment filter.

The sediment filter is a filter manufactured of polypropylene of high density of 5 µm or less, and serves to protect all parts on a path of water, which has passed through this filter, and a membrane filter, which will be described later, by filtering debris and contaminant of 5 µm or more. The sediment filter is a filter based on mechanical filtering, and has excellent effect to remove dust and complex particles existing in water.

Generally, lots of sand and iron particles which are not visible to the eye and other soil components are contained in service water. Also, sludge flowing along a pipe of a deteriorated water supply system or contaminants formed in a water supply pipe are plentifully contained in the service water.

These kinds of particles belong to a relatively large scaled contaminant group among whole contaminants contained in water, and are first filtered by the sediment filter. Then, filters subsequent to the sediment filter serve to filter smaller particles and fine components.

Since the membrane filter provided next to the first filter 320 serves to filter ultra-fine particles, if the membrane filter is directly exposed to relatively large scaled contaminants, its capability may be degraded in a moment, whereby the sediment filter may serve to protect a granule filter such as the membrane filter.

The free-carbon filter removes chemical materials harmful to a human body, such as, chlorine, cancer-causing agents, agricultural pesticides, and synthetic detergent by using an activated carbon absorption process. The activated carbon contained in the free-carbon filter means a special carbon sintered at a high temperature using coconut peel, wood, coal, and the like as raw materials, and means a cluster of amorphous carbons formed during an activation process and well developed with micro-pores of a molecular size.

Although partial chemical adsorption occurs in a normal activated carbon by means of an absorbent having an internal surface area of 800 $m^3$ to 1200 $m^3$ per 1 g, most of absorption corresponds to physical absorption in which a functional group of a carbon atom existing in the activated carbon collects adsorbate molecules by applying attraction to liquid or gas in the vicinity. The free-carbon filter has a function of making good taste of water in addition to a function of removing the smaller sized contaminants through adsorption subsequently to the sediment filter.

The water which has passed through the first filter 320 is guided to the second filter 322. The second filter 322 includes a membrane filter and a post carbon filter. The filter that may be used as the membrane filter is a reverse osmosis (R/O) filter, a hollow fiber membrane filter (UF) or the like.

The hollow fiber membrane filter of the membrane filter is a porous filter having several tens to several hundreds of nanometer (mm) sized pores, and removes contaminants existing in the water by allowing only the water to pass through innumerable fine pores distributed on a membrane surface. A hollow fiber which forms a hollow fiber membrane of the hollow fiber membrane filter means a cluster of thread-like hollow filter fibers.

Although a reverse osmosis (RIO) type water purifier has been mainly used in recent years, the hollow fiber membrane filter serves to make up for a drawback of the reverse osmosis (R/O) type filter that fails to remove mineral in the water. Also, the hollow fiber membrane filter has an advantage in that it is able to be operated even by a natural pressure of the water supply system not a pump of an artificial high pressure. Therefore, the hollow fiber membrane filter can make sure of a certain water flow and has an advantage in that blocking of the filter is little generated, unlike the RIO type filter.

The post carbon filter may remove unpleasant taste and smell, color, etc. which remain in the purified water, to enhance purity of water. The post carbon filter has an activated carbon therein in the same manner as the free-carbon filter. In this embodiment, two filters are physically used, and each filter performs two functions. Therefore, the water which has passed through the first filter 320 and the second filter 322 is filtered by fully passing through four filters, whereby the purified water from which debris is filtered may be provided to the user.

Figure 3:
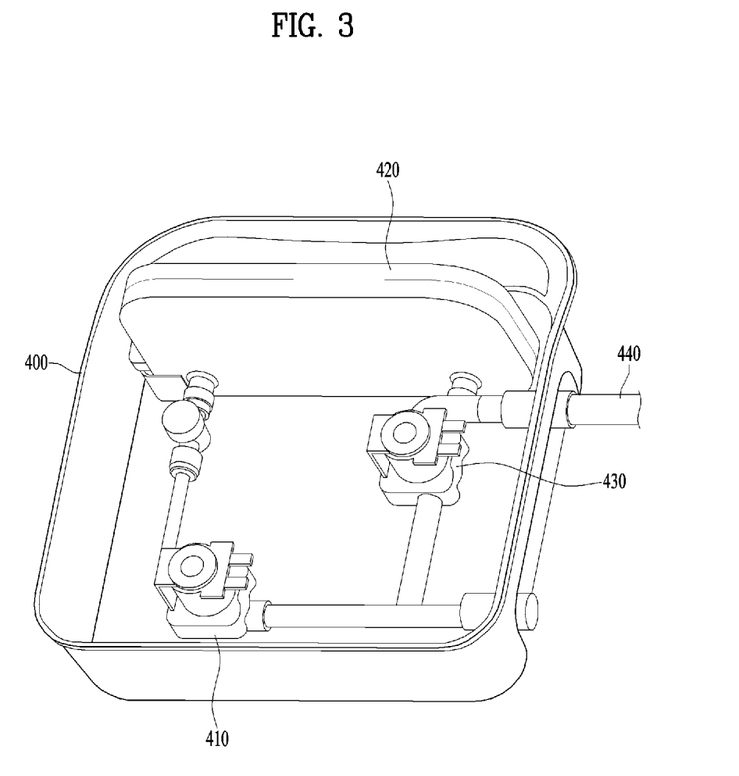
FIG. 3 is a view illustrating a case according to one embodiment of the present invention.

FIG. 3 is a view illustrating a case according to one embodiment of the present invention. The case 400 is provided to be detached from the cabinet 10. Therefore, the case 400 is not connected to the cabinet 10 when the user is supplied with purified water, hot water and cold water through the drinking water supply device. Therefore, the case 400 does not perform a separate function.

A guide pipe 440 is provided at a portion where water is extracted from the case 400, whereby the guide pipe 440 is connected to the cabinet 10 when a path through which water passes inside the cabinet 10 is cleaned. At this time, the guide pipe 440 is detached from the case 400, and may be coupled to the case 400 if necessary. The guide pipe 440 may be provided to have a hose shape capable of being modified.

The case 400 is provided with a second hot water module 420 for heating water supplied from the outside, and the second hot water module 420 is provided with a first valve 410 for switching a path of water supplied to the second hot water module 420. That is, if the first valve 410 opens the path, the water may be supplied to the second hot water module 420 by passing through the first valve 410.

Also, a second valve 430 for switching a bypass path is provided such that water is not supplied to the second hot water module 420. That is, if the second valve 430 opens the path, water is not supplied to the second hot water module 420, and is discharged out through the guide pipe 440.

Figure 4:
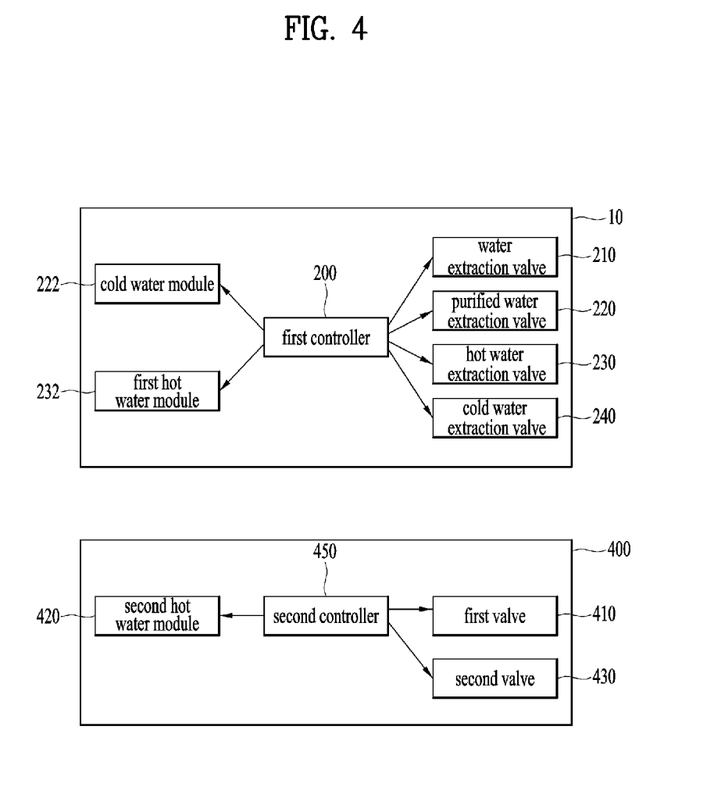
FIG. 4 is a control block view according to one embodiment of the present invention.
Figure 5:
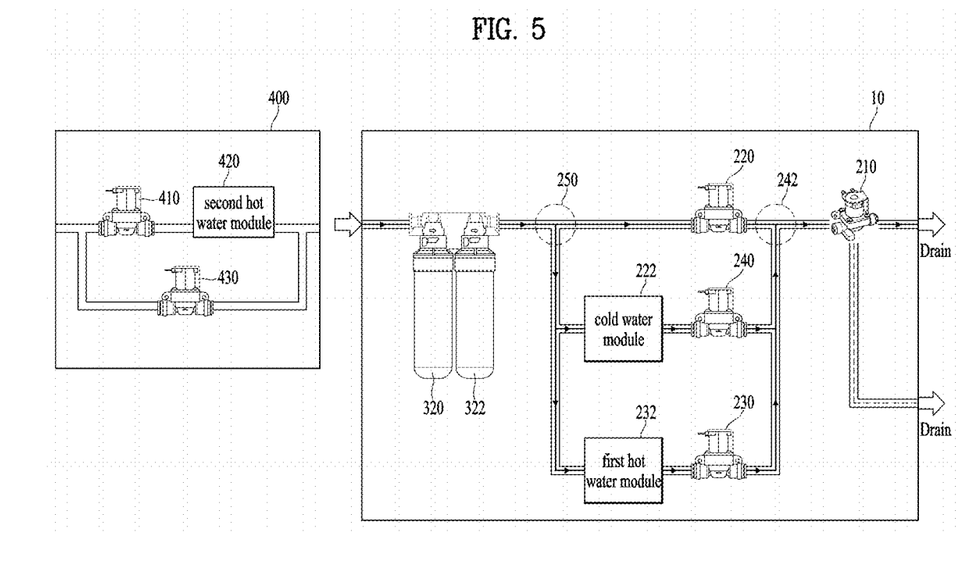
FIG. 5 is a view illustrating a state that any one of purified water, hot water, and cold water is supplied to a user.

FIG. 4 is a control block view according to one embodiment of the present invention, and FIG. 5 is a view illustrating a state that any one of purified water, hot water, and cold water is supplied to a user. Referring to FIGS. 4 and 5, the first filter 320 and the second filter 322 are detachably provided in the cabinet 10. The filter 320 and the second filter 322 serve to purify water supplied to the cabinet 10.

The cabinet 10 includes a purified water extraction valve 220 provided in the cabinet 10, switching a path for discharging water purified by being supplied from the outside of the cabinet 10 to the user, a cold water module 222 provided in the cabinet 10, cooling externally supplied water, a cold water extraction valve 240 for switching a path for discharging cold water cooled from the cold water module 222 to the user, a first hot water module 232 provided in the cabinet 10, heating externally supplied water, and a hot water extraction valve 230 for switching a path for discharging hot water heated from the first hot water module 232 to the user.

Meanwhile, a divergence pipe 250 is provided to distribute the water which has passed through the first filter 320 and the second filter 322 into the purified water extraction valve 220, the cold water extraction valve 240, and the hot water extraction valve 230.

Therefore, the water filtered by passing through the filters 320 and 322 may be distributed into the purified water extraction valve 220, the cold water module 222, and the first hot water module 232 after passing through the divergence pipe 250. The divergence pipe 250 may simplify a moving path of water inside the cabinet 10, thereby providing water to the user by passing through each valve. That is, since a path where water is discharged may be divided into three types of paths by the divergence pipe 250, the paths may be simplified.

Also, the cabinet 10 is provided with a water extraction valve 210 provided in the cabinet 10, switching a path where the water which has passed through the purified water extraction valve 220, the hot water extraction valve 230 and the cold water extraction valve 240 is finally discharged to the user. A connection pipe 242 where three paths are integrated into one path is provided before the water extraction valve 210, that is, among the purified water extraction valve 220, the cold water extraction valve 240, and the hot water extraction valve 230.

An inlet of the connection pipe 242 is provided with three paths, and its outlet is provided with one path, whereby the outlet of the connection pipe 242 is connected to the water extraction valve 210. Since three paths are integrated into one path, the path inside the cabinet 10 may be simplified.

That is, after the water entering the cabinet 10 is divided into three paths through the divergence pipe 250, the three paths are integrated into one path by the connection pipe 242. Therefore, each path is simplified, and washing water inside the path may move to all paths where water moves.

If the purified water extraction valve 220 and the water extraction valve 210 are opened together, the purified water which has passed through the purified water extraction valve 220 may be provided to the user. If the hot water extraction valve 230 and the water extraction valve 210 are opened together, the hot water which has passed through the hot water extraction valve 230 may be provided to the user. If the cold water extraction valve 240 and the water extraction valve 210 are opened together, the cold water which has passed through the cold water extraction valve 240 may be provided to the user.

The cold water module 222 performs a function of cooling water. Therefore, the cold water module 222 may include a cooling cycle including a compressor, an evaporator, etc. Unlike this case, water may be cooled using a thermoelectric element. In this embodiment, various devices may be adopted for the cold water module 222 to cool water.

The first hot water module 232 performs a function of heating water. Therefore, the first hot water module 232 may include a heater, etc. In this embodiment, various devices may be adopted for the first hot water module 232 to heat water.

Since the water extraction valve 210 includes a two-way valve, water which has passed through the water extraction valve 210 may be discharged to the outside through a separate drain line without being provided to the user. That is, if the water extraction valve 210 closes a path for supplying water to the user and opens the drain line, water is discharged to the outside of the cabinet 10 through the drain line.

The cabinet 10 is provided with a first controller 200 for controlling the water extraction valve 210, the purified water extraction valve 220, the hot water extraction valve 230, the cold water extraction valve 240, the cold water module 222, and the first hot water module 232. The first controller 200 may perform a control operation based on various operations such as an operation of a user who pushes the button 17. In addition, the first controller 200 may control each element in accordance with a control algorithm that is already input.

The case 400 is provided with a second controller 450 for controlling the first valve 410, the second valve 430, and the second hot water module 420. The second hot water module 420 may include a heater to heat water which has passed through the path. The second controller 450 also performs a control operation in accordance with the user's pushing operation. If the user performs a certain operation, the second controller 450 may control each element in accordance with a control algorithm that is already input.

The operation of supplying any one of purified water, hot water and cold water to a user will be described with reference to FIG. 5. When any one of purified water, hot water and cold water is supplied to a user, water which has not passed through the case 400 is supplied to the cabinet 10. That is, the case 400 is not involved in the operation of the cabinet 10, and the case 400 does not perform a function. Therefore, original water such as tap water is supplied to the cabinet 10.

Water externally supplied to the cabinet 10 passes through the first filter 320 and the second filter 322, and is divided through three paths by the divergence pipe 250. If the user desires to extract purified water, the first controller 200 opens the purified water extraction valve 220 and the water extraction valve 210. Therefore, the user may be supplied with the purified water through the water extraction nozzle 110. The water which has passed through the divergence pipe 250 passes through the purified water extraction valve 220 and then is guided to the water extraction nozzle 110 through the connection pipe 242.

If the user desires to extract hot water, the first controller 200 opens the hot water extraction valve 230 and the water extraction valve 210. At this time, the first hot water module 232 may be driven to heat water. Therefore, the user may be supplied with the hot water through the water extraction nozzle 110. The water which has passed through the divergence pipe 250 passes through the hot water extraction valve 230 and then is guided to the water extraction nozzle 110 through the connection pipe 242.

If the user desires to extract cold water, the first controller 200 opens the cold water extraction valve 240 and the water extraction valve 210. At this time, the cold water module 222 may be driven to make water cool. Therefore, the user may be supplied with the cold water through the water extraction nozzle 110. The water which has passed through the divergence pipe 250 passes through the cold water extraction valve 240 and then is guided to the water extraction nozzle 110 through the connection pipe 242.

Figure 6:
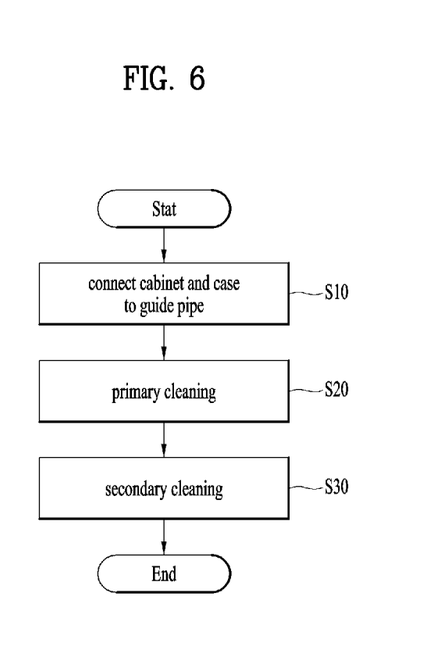
FIG. 6 is a control flow chart according to one embodiment.

FIG. 6 is a control flow chart according to one embodiment. According to one embodiment, the cabinet 10 and the case 400 are connected to each other by the guide pipe 440 (S10). Therefore, a path where water moves from the case 400 to the cabinet 10 may be formed.

Primary cleaning is performed (S20), and then secondary cleaning (S30) is performed. In this embodiment, cleaning is performed twice, and kinds of washing water used for each cleaning are different from each other, and their supply modes are different from each other, whereby the path where water moves in the cabinet 10 may cleanly be washed.

Figure 7:
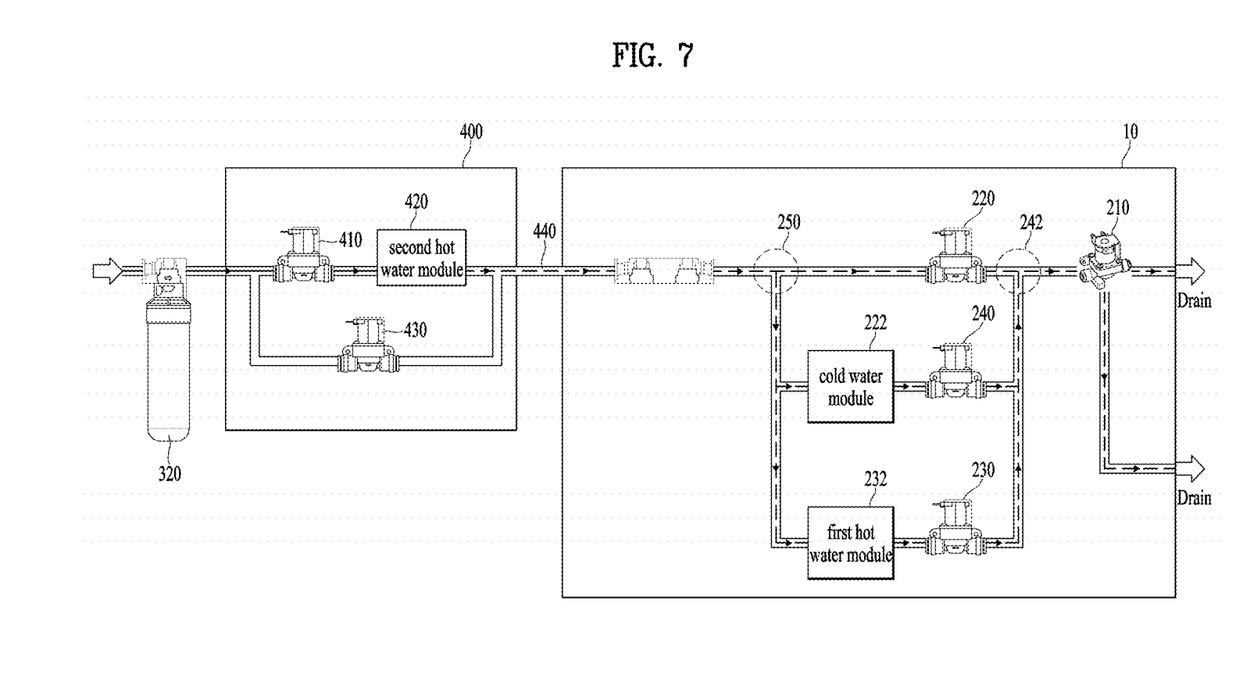
FIG. 7 is a view illustrating a state of primary cleaning.

FIG. 7 is a view illustrating a state of primary cleaning. Referring to FIG. 7, the first filter 320 and the second filter 322 are detached from the cabinet 10. Since the first filter 320 and the second filter 322 are detachably provided in cabinet 10, water does not leak to the portion from which the first filter 320 and the second filter 322 are detached, even though the first filter 320 and the second filter 322 are detached from the cabinet 10.

The first controller 200 opens all of paths of the water extraction valve 210, the purified water extraction valve 220, the hot water extraction valve 230 and the cold water extraction valve 240 during the primary cleaning. As all of the valves of the cabinet 10 open the paths, the washing water supplied to the cabinet 10 may pass through the path through which water passes in the cabinet 10. Also, since the first controller 200 does not drive the cold water module 222 and the first hot water module 232, water passes without being cooled or heated.

The second controller 450 drives the second hot water module 420 during the primary cleaning. The second controller 450 opens the path of the first valve 410 and closes the path of the second valve 430. Therefore, the water supplied to the cabinet 10 is hot water heated by the second hot water module 420.

The first filter 320 may be disposed in the path for supplying water to the case 400. That is, before water is supplied to the case 400, the water is filtered by the first filter 320, whereby elements arranged in the case 400 may be prevented from being contaminated. The water heated by the second water module 420 is supplied to the cabinet 10 through the guide pipe 440.

That is, if the second hot water module 420 is driven, the second controller 450 opens the first valve 410 and closes the second valve 430, whereby the water is guided to the second water module 420. The hot water guided by the guide pipe 440 moves to all paths where water moves in the cabinet 10, through the divergence pipe 250, and passes through the connection pipe 242. Therefore, all paths where water move may be maintained at a heated state by the hot water.

Since the valves provided in the cabinet 10 are all opened by the first controller 200, the hot water continues to be discharged through the water extraction nozzle 100. At this time, the hot water which is discharged is water, which is used when the inside of the cabinet 10 is cleaned, not the hot water supplied to the user.

In this embodiment, since the hot water supplied to the cabinet 10 though the guide pipe 440 is supplied to all paths of the cabinet 10, all paths of the cabinet 10 may be cleaned, whereby cleanliness may be improved. That is, since the path supplied to the divergence pipe 250 is diverged into paths for supplying purified water, cold water and hot water, the inside of the cabinet 10 may be cleaned by the hot water supplied from the second hot water module 420.

Meanwhile, the water supplied to the cabinet 10 may be discharged to the outside through the water extraction nozzle 110 while passing through the water extraction valve 210, or may be discharged through a drain pipe which is separately provided. The water may be discharged to the outside of the cabinet 10 through any one of the water extraction nozzle 110 and the drain pipe.

In case of the aforementioned primary cleaning, the second controller 450 repeatedly opens and closes the first valve 410 in a state that the second valve 430 is closed, whereby the hot water discharged through the second hot water module 420 may have pulsation. Therefore, a cleaning power may be improved during the primary cleaning.

Figure 8:
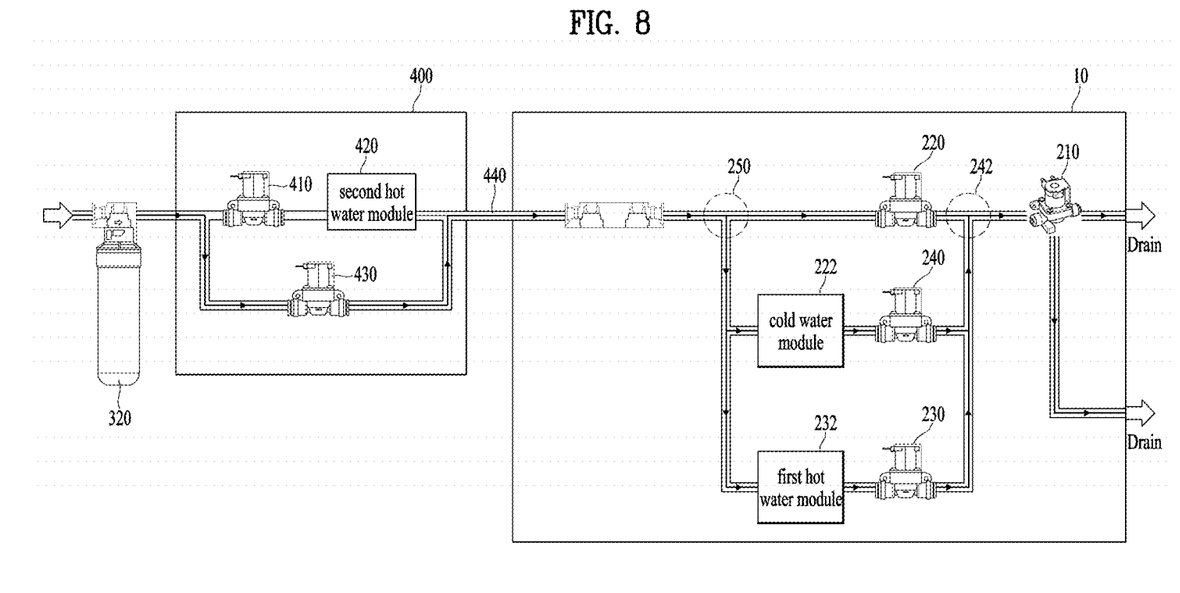
FIG. 8 is a view illustrating a state of secondary cleaning.

FIG. 8 is a view illustrating a state of secondary cleaning. Referring to FIG. 8, the second controller 450 closes the first valve 410 and opens the second valve 430 during the secondary cleaning. The second controller 450 does not drive the second hot water module 420.

Therefore, water supplied to the case 400 is not heated by the second hot water module 420, and thus is not different from the hot water used during the primary cleaning. However, since the water is filtered through the first filter 320 during the secondary cleaning, the water does not contaminate the inside. Since the water supplied to the case 400 passes through the first filter 320 only, a water pressure of water discharged from the case 400 through the guide pipe 440 is not reduced significantly.

Therefore, the path inside the cabinet 10 may cleanly be washed by a pressure of water discharged by passing through the guide pipe 440. If the second filter 322 is disposed at the front of the case 400, a water pressure of water may significantly be reduced in view of filtering characteristic of the second filter 322. However, since the first filter 320 is only applied to this embodiment, it is possible to make sure of a sufficient water pressure for cleaning the inside of the cabinet 10.

At this time, since the valves inside the cabinet 10 are all opened, the water supplied to the cabinet 10 is discharged through the water extraction nozzle 110. In the same manner as the primary cleaning, the water supplied through the guide pipe 440 is supplied to all paths where water moves inside the cabinet 10 during the secondary cleaning, whereby all of the paths inside the cabinet 10 may be cleaned.

Meanwhile, in a state that the first valve 410 is closed, opening and closing of the second valve 430 may repeatedly be performed during the secondary cleaning. Therefore, the water supplied to the cabinet 10 through the guide pipe 440 may have pulsation. For example, if the second valve 430 is opened and closed at an interval of 1 second, the water passing through the inside of the cabinet 10 is repeatedly supplied or not at an interval of 1 second. As a water pressure of the path through which water passes is changed, the amount of water flowing along the path is changed, whereby a cleaning power for the path may be improved.

That is, a water flow of water is changed due to pulsation, and debris on an inner wall of the path may easily be removed and discharged to the outside. Even in case of the secondary cleaning, the water supplied to the cabinet 10 is guided to the connection pipe 242 after passing through the divergence pipe 250, whereby the water may be discharged to the outside of the water extraction valve 210. At this time, the washing water may be discharged to the outside of the cabinet 10 through any one or both of the drain pipe and the water extraction nozzle 110.

Figure 9:
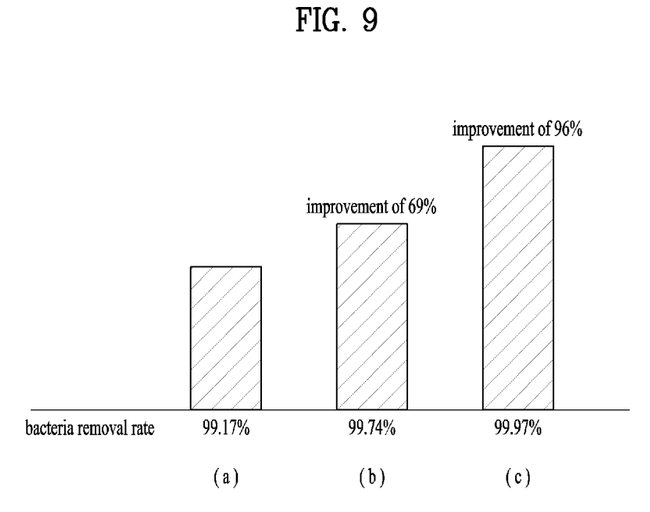
FIG. 9 is a view illustrating advantageous effects of one embodiment of the present invention.

FIG. 9 is a view illustrating advantageous effects of one embodiment of the present invention. 'a' of FIG. 9 illustrates an experimental result indicating that room temperature water not hot water is used during primary cleaning and water continues to be supplied without generation of pulsation during secondary cleaning. A removal rate of bacteria stuck to the path is 99.17%.

'b' of FIG. 9 illustrates an experimental result indicating that hot water is used during primary cleaning and water continues to be supplied without generation of pulsation during secondary cleaning. A removal rate of bacteria stuck to the path is 99.74%. In comparison with 'a', an improvement effect of 69.9% has been obtained in V.

'c' of FIG. 9 illustrates an experimental result indicating that hot water is used during primary cleaning and pulsation is generated during secondary cleaning. A removal rate of bacteria stuck to the path is 99.97%. In comparison with 'a', an improvement effect of 96% has been obtained in 'c'.

According to the experiment of FIG. 9, it is noted that a cleaning power for the path is more improved during the primary cleaning when hot water is used than that hot water is not used. Also, according to the experiment of FIG. 9, it is noted that a cleaning power for the path is improved if pulsation is used during the secondary cleaning.

In this embodiment, hot water having a temperature higher than that of room temperature water is used during the primary cleaning. At this time, the hot water which is used may be 60° C. to 75° C., approximately. The room temperature water may be used during the secondary cleaning, and the valves may be switched on/off in due order to generate pulsation, whereby a pressure change has occurred. Since the room temperature water is used during the secondary cleaning, the path inside the cabinet 10 may be cooled at a room temperature, whereby hot water may be prevented from being generated in a moment when the user extracts cold water or purified water.

In this embodiment, there is a change in kinds of washing water used for cleaning of two steps and supply methods and pressures of washing water, whereby a cleaning power for the path of the cabinet may be improved.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

The present invention provides drinking water supply device capable of cleaning a path through which water moves.

What is claimed is:

1. A liquid dispenser comprising:
   at least one liquid path through which a liquid flows;
   at least one extraction valve configured to dispense the liquid;
   a first liquid heating module provided upstream from the at least one extraction valve and configured to heat the liquid;
   a second liquid heating module provided upstream from the at least one extraction valve and configured to heat the liquid;
   at least one valve configured to guide the liquid into the second liquid heating module;
   a guide pipe configured to guide the liquid which has passed through the second liquid heating module into the at least one liquid path; and
   a bypass path that bypasses the second liquid heating module,
   wherein during a first cleaning operation, the at least one valve is repeatedly opened and closed to supply the liquid to the second liquid heating module, and
   wherein the at least one valve includes a first valve provided upstream from the second liquid heating module and a second valve provided in the bypass path, and during a second cleaning operation, the first valve is closed and the second valve is repeatedly opened and closed to supply the liquid to the at least one extraction valve.

2. The liquid dispenser of claim 1, further comprising a first controller configured to control the at least one extraction valve to be opened or closed.

3. The liquid dispenser of claim 2, wherein the at least one extraction valve includes a room temperature extraction valve, a cold extraction valve, and a hot extraction valve, and
   wherein the first controller opens each of the room temperature extraction valve, the hot extraction valve, and the cold extraction valve during the first or second cleaning operation.

4. The liquid dispenser of claim 3, further comprising:
   a cold liquid module provided on the at least one liquid path upstream from the cold extraction valve,
   wherein the first liquid heating module is provided upstream from the hot extraction valve.

5. The liquid dispenser of claim 4, further comprising a divergence pipe that diverts the liquid toward at least one of the room temperature extraction valve, the cold liquid module, or the first liquid heating module.

6. The liquid dispenser of claim 4, wherein the at least one liquid path includes a hot liquid path including the first liquid heating module and the hot extraction valve and a cold liquid path including the cold liquid module and the cold extraction valve, and
   wherein the hot liquid path and the cold liquid path are in parallel to each other.

7. The liquid dispenser of claim 6, further comprising a first filter and a second filter configured to be detachable from the at least one liquid path, wherein the first filter and the second filter are arranged upstream from the cold liquid path and the hot liquid path.

8. The liquid dispenser of claim 1, further comprising a first filter and a second filter configured to be detachable from the at least one liquid path, wherein the first filter is configured to be attached either upstream or downstream from the second liquid heating module.

9. The liquid dispenser of claim 8, further comprising a second controller configured to control the first valve and the second valve.

10. The liquid dispenser of claim 9, wherein the second controller opens the first valve and closes the second valve when the second liquid heating module is driven.

11. The liquid dispenser of claim 9, wherein the second controller closes the first valve and opens the second valve when the second liquid heating module is not driven.

12. The liquid dispenser of claim 11, wherein the second controller repeatedly opens and closes the second valve within a predetermined time when the first valve is closed.

* * * * *